US006926030B2

(12) United States Patent
Ricciardi et al.

(10) Patent No.: US 6,926,030 B2
(45) Date of Patent: Aug. 9, 2005

(54) APPARATUS FOR MIXING TWO FLUIDS OR KEEPING THEM SEPARATE

(75) Inventors: Ronald J. Ricciardi, Woodcliff Lake, NJ (US); Marc S. Landry, Vernon, NJ (US)

(73) Assignee: Acrison, Inc., Moonachie, NJ (US)

( * ) Notice: Subject to any disclaimer, the term of this patent is extended or adjusted under 35 U.S.C. 154(b) by 107 days.

(21) Appl. No.: 10/176,901

(22) Filed: Jun. 21, 2002

(65) Prior Publication Data

US 2003/0234055 A1 Dec. 25, 2003

(51) Int. Cl.[7] ................ G05D 11/03
(52) U.S. Cl. ................ 137/605; 137/897
(58) Field of Search ................ 137/605, 895, 137/896, 897

(56) References Cited

U.S. PATENT DOCUMENTS

| | | | | |
|---|---|---|---|---|
| 2,044,629 A | | 6/1936 | Parker | |
| 2,646,066 A | | 7/1953 | Nemetz | |
| 2,682,890 A | | 7/1954 | May | |
| 2,830,612 A | | 4/1958 | Taylor | |
| 3,246,845 A | | 4/1966 | Techler et al. | |
| 3,430,865 A | | 3/1969 | McDougall | |
| 3,598,145 A | * | 8/1971 | Wolfson | 137/533.21 |
| 3,709,433 A | | 1/1973 | Obergefell et al. | |
| 4,311,160 A | * | 1/1982 | Charland | 137/111 |
| 4,505,431 A | | 3/1985 | Huffman | |
| 4,549,813 A | * | 10/1985 | Volz et al. | 366/160.1 |
| 4,666,429 A | * | 5/1987 | Stone | 604/83 |
| 4,955,544 A | | 9/1990 | Kopp | |
| 5,119,989 A | | 6/1992 | Kamis | |
| 5,205,647 A | | 4/1993 | Ricciardi | |
| 5,301,718 A | * | 4/1994 | Bolhofner | 137/893 |
| 5,758,691 A | * | 6/1998 | Nedderman, Jr. | 137/895 |
| 5,823,439 A | * | 10/1998 | Hunter et al. | 239/205 |
| 5,862,954 A | | 1/1999 | Ehrensperger et al. | |
| 5,950,670 A | * | 9/1999 | Flaim | 137/493.8 |
| 5,975,130 A | * | 11/1999 | Ligh et al. | 137/519.5 |

FOREIGN PATENT DOCUMENTS

| | | |
|---|---|---|
| DE | 197 20 528 | 11/1998 |
| GB | 2 029 548 | 3/1980 |

* cited by examiner

*Primary Examiner*—Stephen M. Hepperle
(74) *Attorney, Agent, or Firm*—Fish & Richardson P.C.

(57) ABSTRACT

A mixing apparatus for mixing two fluids immediately following contact with each other is disclosed. The mixing apparatus includes a spring-loaded ball valve separating a first fluid from a second fluid. The ball valve closes as a result of at least spring force. The ball valve opens as a result of hydraulic pressure of one of the fluids operating against the spring force. Mixing is accomplished instantaneously by dispersing one fluid in a thin pattern around the open ball valve into a stream of the other fluid.

8 Claims, 2 Drawing Sheets

APPARATUS FOR MIXING TWO FLUIDS OR KEEPING THEM SEPARATE

BACKGROUND OF THE INVENTION

This invention relates to an apparatus that can perform dual functions of isolating and mixing two different fluids. The apparatus can be used to dilute or pre-mix one fluid with another and, when not in operation, completely isolates the two starting fluids from each other.

Many processes require mixing two different fluids or diluting one fluid with another. For example, liquid polyelectrolytes (polymers) used in various water treatment and wastewater treatment processes must be diluted with water to create solutions having small concentrations, say, up to approximately 10% polymer, by weight or volume. Due to the large amount of water required to achieve this level of dilution, it is usually more cost effective to transport the polymer ingredient to the site and to dilute it with water already available at the site.

The polymers to be diluted can be compositions such as polyelectrolytes, for example. Proper mixing of liquid polymers with water is not always easy. Most polymers can activate very quickly once they come into contact with water or aqueous compositions, and can form a highly viscous and sticky agglomeration if not promptly and thoroughly mixed with an appropriate amount of water. A positive means of mixing must be implemented to dilute the polymer effectively. The viscosity of a particular solution can vary in direct proportion to the percentage of polymer in the solution. In other words, as the percentage of polymer in the solution is increased, the viscosity of the solution is also increased, and vice versa. Inadequate or slow mixing of the liquid polymer with the water can result in excessive and undesirable coagulation of the mixture and consequent clogging or obstruction of system piping and components. Clogging can be so significant that a system might be rendered inoperable until it is cleaned and the obstruction is cleared.

SUMMARY OF THE INVENTION

The apparatus of the invention provides a positive seal to avoid completely any possibility of polymer leakage into any part of a water or aqueous solution line whenever the polymer metering pump is not pumping or the system is otherwise idle. As has been noted above, to allow liquid polymer to come into contact with water or an aqueous solution when such is not desired will activate the polymer and thus cause extensive coagulation of the polymer, which will thus foul and clog the components and piping of the apparatus.

The present invention provides apparatus and a technique for blending and/or isolating two fluids. Although this technique has wide application to a number of mixing protocols, it is particularly useful for mixing liquid polymers and water to create solutions commonly used in water treatment and wastewater treatment processes.

According to an aspect of the invention, when in use, water can be continuously directed into one end of a mixing assembly. In the central section of the mixing assembly, liquid polymer enters the water stream by the exertion of hydraulic pressure in the polymer supply line that overcomes the seal formed by a spring-loaded ball. The polymer supply line pressure, generated by a polymer feed pump, overcomes the force holding the ball in sealing engagement with a valve seat and forces the ball off the valve seat, thus allowing the polymer to flow between the valve seat and the ball in the shape of a thin, cone-shaped stream as it begins passing around the ball. The polymer will then disperse rapidly into the vigorously flowing water stream which is passing tangentially through the vicinity of the valve. This technique produces easy and instantaneous blending of the liquid polymer and water, allowing the thusly formed mixture to exit the mixing assembly as a "pre-blended solution."

The mixing assembly of the invention improves the overall polymer dilution process by providing a pre-blended solution of polymer and water, sufficient to avoid unwanted coagulation, before the mixture thus formed enters a downstream primary mixing or activation mechanism for more thorough mixing. The mixing assembly of the invention thus provides immediate "pre-blending" or "pre-mixing" of the two fluids as soon as they come into contact with each other. This immediate pre-mixing is important in applications where the fluids react with each other rapidly to produce highly viscous solutions.

Equally important, during periods of time when the system is idle, the mixing assembly of the invention completely seals off one fluid from the other fluid, thus preventing any leakage and inadvertent contact that could result in coagulation and system clogging or fouling.

In a typical system, a metering pump controls the amount and flow of polymer delivered to the mixing assembly and a water regulator or pump typically controls the flow of water into the mixing assembly, as measured, for example, by a rotameter or a flow meter. Thus, the desired ratio of polymer to water can be easily maintained by controlling the polymer metering pump and the water supply, either manually or automatically, in known ways.

The details of one or more embodiments of the invention are set forth in the accompanying drawings and the description below. Other features, objects, and advantages of the invention will be apparent from the description, drawings and claims.

DETAILED DESCRIPTION

Figure 1:
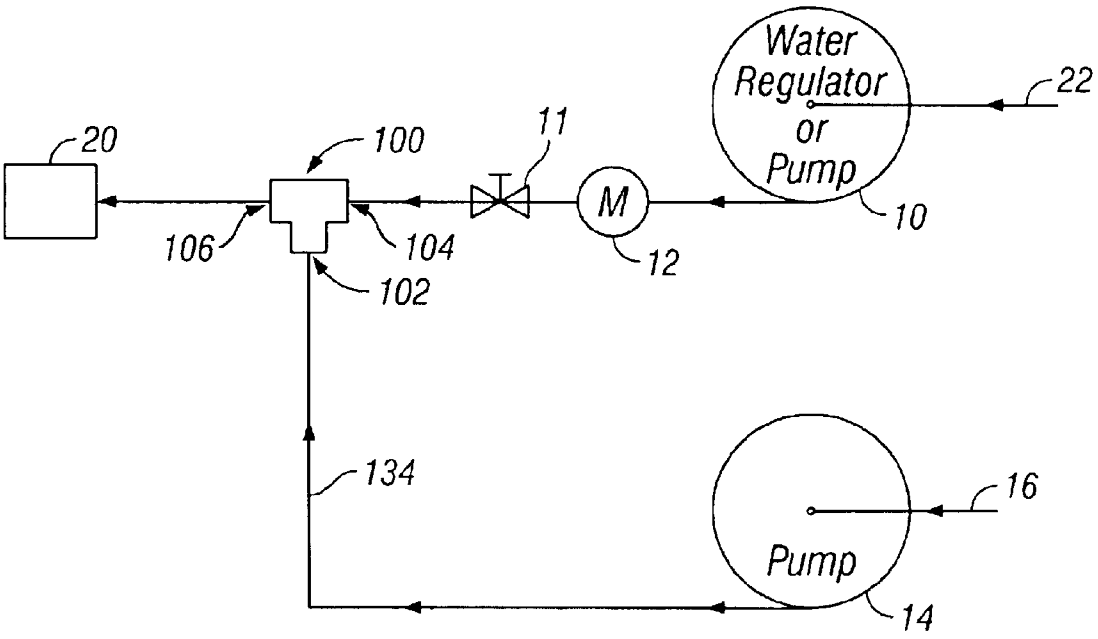
FIG. 1 is a schematic representation of a mixing system according to the invention.
Figure 2:
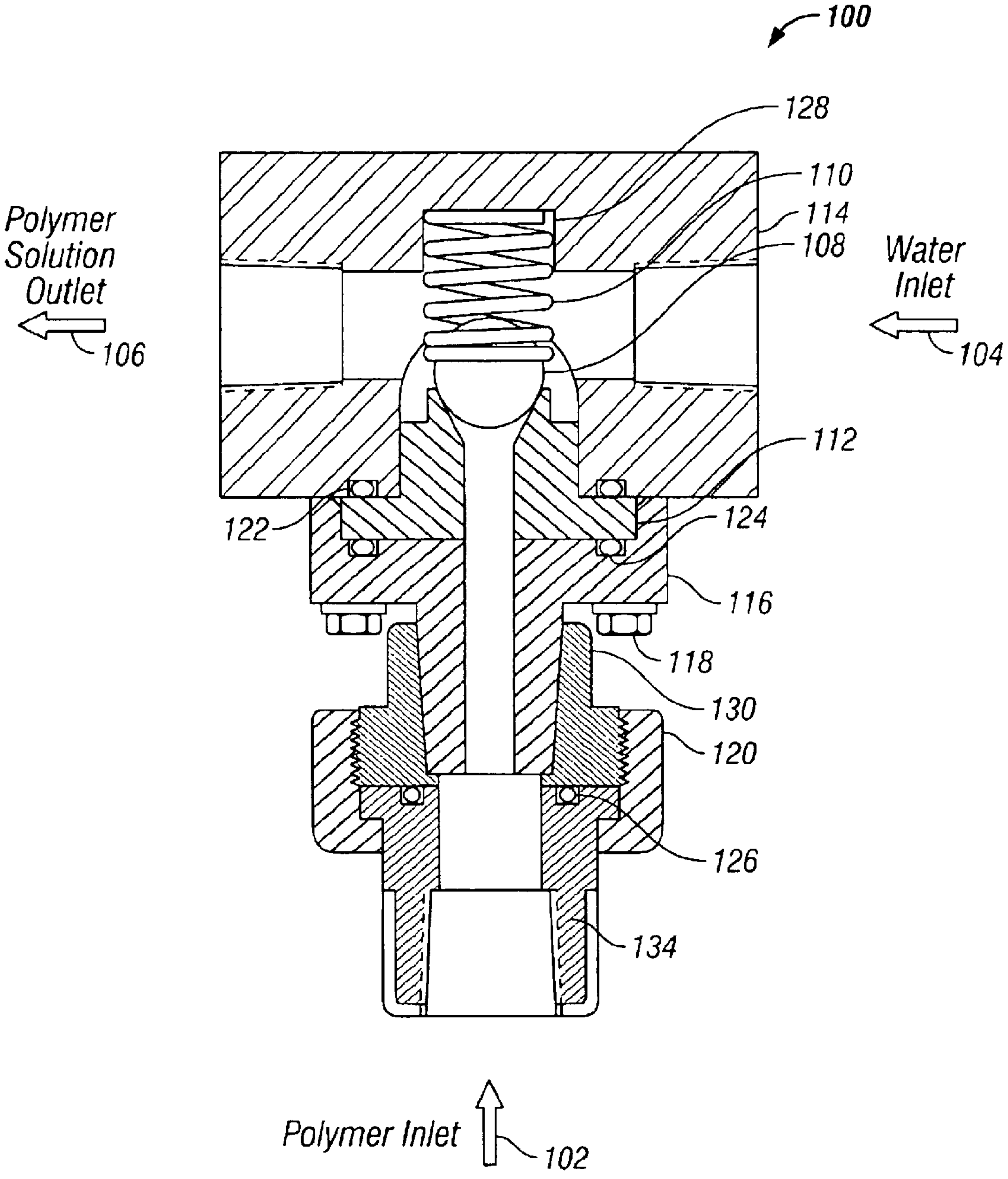
FIG. 2 is a sectional elevation view of a mixing assembly according to the invention.

In the particular system of FIG. 1, water regulator or pump 10 supplies water from water source 22 at a constant, but adjustable rate. The water flows through rotameter or flow meter 12, throttling valve 11 for flow control, and then into water inlet port 104 of mixing assembly 100. The rotameter or flow meter 12 measures the water flow rate and the throttling valve 11 permits flow control of the water source 22 either manually or automatically, in ways known to those of ordinary skill in the art. Polymer metering pump 14 pumps, under pressure, a predetermined quantity of liquid polymer from liquid polymer source 16 to polymer inlet port 102 of mixing assembly 100. The liquid polymer is injected with force into a turbulent water stream, thus forming a pre-blended solution of the fluids in mixing assembly 100. This polymer/water mixture then moves toward mixture (or polymer solution) outlet port 106 from the vicinity of ball 108 (FIG. 2). Further mixing occurs here due to the flow turbulence of the water stream. The liquid polymer/water mixture exits mixing assembly 100 through mixture outlet port 106. The mixture then flows into primary mixing device 20 downstream of mixing assembly 100 where thorough mixing and final polymer activation occurs.

Referring to FIG. 2, water flows into mixing assembly 100 at water inlet port 104. As shown, liquid polymer can enter the mixing assembly at the polymer inlet port 102 and around ball 108 when the device is in operation. When the device is not in operation, ball 108 mates with valve seat 112 as a result of at least the seating force imparted by spring 110. Spring 110 is situated between ball 108 and recessed area 128 on the inside surface of injector housing 114. Ball 108 provides a liquid tight seal against valve seat 112 when they are mated. Polymer metering pump 14 is designed to provide a polymer pressure great enough to overcome the force of spring 110. This pressure forces ball 108 off valve seat 112, thus allowing liquid polymer to flow around ball 108 and disperse into the flowing water passing by ball 108 in a fine, thin conical stream. This liquid polymer stream instantaneously blends with the water flowing past ball 108 toward mixture outlet port 106. The mixture then exits the mixing assembly 100 through the mixture outlet port 106.

Valve-securing member 116 holds valve seat 112 in place. Securing hardware 118 attaches valve-securing member 116 to injector housing 114. In the drawing, pipe-mating member 130 is integral with valve-securing member 116. Pipe-mating member 130 has threads which co-act with threads on union 120 to allow easy connection of mixing assembly 100 to polymer supply line 134. O-ring 126 is provided to prevent liquid polymer from leaking where polymer supply line 134 meets mixing assembly 100. O-ring 124 is also provided to prevent leakage of liquid polymer between valve seat 112 and valve-securing member 116. Another O-ring 122 is provided to prevent leakage of liquid polymer between injector housing 114 and valve seat 112. Alternates to the O-rings and securing hardware 118 can, of course, be implemented in place of the specific features described above, as will be readily apparent to those of ordinary skill in the art.

Mixing assembly 100 can generally, but need not, be configured as shown in FIG. 1 and FIG. 2, with the liquid polymer entering mixing assembly 100 from below. Such a configuration is desirable because gravity would then assist spring 110 with seating ball 108 on valve seat 112. Other orientations or configurations can, of course, be used as alternatives without departing from the spirit and scope of the invention.

In a typical system, polymer metering pump 14 is capable of producing a pressure ranging from approximately 50 to approximately 150 pounds per square inch and the ball 108 and spring 110 arrangement is designed to unseat at a liquid polymer pressure of approximately 30 pounds per square inch. This unseating pressure can be adjusted by using alternative pumps and/or springs having different physical and operational characteristics, as will be readily apparent to those of ordinary skill.

Because certain liquid polymers have been found to be somewhat corrosive, spring 110 is made of various metallic materials and then coated with a protective material to enhance its ability to resist corrosion. Such protective materials can typically be plastic, rubber or other synthetic or synergistic type coatings. Ball 108 can be made of various metallic materials, ceramic, or synthetic materials. If made of stainless steel, ball 108 can be coated with a protective material to enhance its resistance to corrosion. Such protective materials can typically be plastic, rubber or other synthetic or synergistic type coatings. Valve seat 112 can be made of, or can comprise, a more pliable synthetic material than ball 108 comprises. The combination of a harder ball 108 with a softer, more pliable valve seat 112 provides an excellent seal for preventing inadvertent leakage of liquid polymer into the water stream, or vice versa. This excellent seal is achieved because a more pliable valve seat 112 can conform to ball 108. Of course, as will be readily appreciated by one of ordinary skill, ball 108 can comprise the more pliable material, with valve seat 112 being made of a harder material to provide excellent sealing capability.

Other parts of the mixing assembly 100 may be constructed using synthetic materials, such as acrylic, polycarbonate and polyvinylchloride (PVC), as well as stainless steel. Various components such as injector housing 114 and valve-securing member 116 may be made of transparent or translucent material, if desired, to allow visual observation of the operation of mixing assembly 100.

Mixing assembly 100 can be designed for handling a wide range of water flow rates typically from a fraction of a gallon per minute up to several hundred gallons per minute. Mixing assembly 100 can also be designed to handle a wide range of polymer flow rates ranging typically from a fraction of a gallon per hour, up to several hundred gallons per hour. In a typical system, a rotameter or flow meter 12 is used to measure the water flow rate and a metering pump 14 is used to set the liquid polymer flow rate. Adjusting these parameters sets the desired ratio of polymer to water. This can be done either manually or automatically, as will be readily apparent to one of ordinary skill. Useful solutions of liquid polymers in various water treatment or wastewater treatment processes can have concentrations, say, from approximately 0.25% polymer by weight or volume up to, say, approximately 10% polymer by weight or volume. As will be appreciated, these percentages can vary beyond the stated amounts.

A number of embodiments and variations of the invention have been described. Nevertheless, it will be understood that various modifications can be made without departing from the spirit and scope of the invention. For example, the techniques disclosed herein can be used to mix fluids other than those specifically disclosed herein. Additionally, other materials may be used to form the different components described herein. Accordingly, other embodiments are within the scope and spirit of the invention and the following claims.

What is claimed is:

1. An apparatus for mixing a first fluid and a second fluid comprising:

a mixing assembly;

a first inlet port for the first fluid to enter the mixing assembly;

a second inlet port for the second fluid to enter the mixing assembly;

an outlet port for a mixture of the first fluid and the second fluid to exit the mixing assembly; and a pressure-actuated valve located at an intersection of the first inlet port and the second inlet port for introduction of the second fluid into the first fluid at the intersection, the pressure-actuated valve including a spring-biased ball to mate with a valve seat to control the flow of the second fluid, wherein the apparatus is configured when in use so that a first flow path from the first inlet port to the outlet port is substantially in a horizontal direction; and a second flow path from the second inlet port to the first flow path is substantially in a vertical direction.

2. The apparatus of claim 1 wherein the ball is held in mating relation with the valve seat as a result of force produced by at least the spring.

3. The apparatus of claim 2 wherein the pressure-actuated valve opens in response to a hydraulic force imparted by the second fluid on the ball sufficient to overcome the force of at least the spring.

4. The apparatus of claim 1 wherein the ball comprises a less deformable material than the valve seat.

5. The apparatus of claim 1 wherein the ball comprises a ceramic material and the valve seat comprises polytetrafluoroethylene.

6. The apparatus of claim 1 wherein the spring is coated with a synthetic or a synergistic material.

7. The apparatus of claim 1 wherein the first fluid is water and the second fluid is a liquid polyelectrolyte.

8. The apparatus of claim 1 wherein the mixing assembly is transparent or translucent.

* * * * *